United States Patent [19]
Gaylord

[11] 3,958,069
[45] May 18, 1976

[54] CELLULOSE-POLYMER COMPOSITES

[75] Inventor: Norman G. Gaylord, New Providence, N.J.

[73] Assignee: Champion International Corporation, Stamford, Conn.

[22] Filed: Mar. 22, 1973

[21] Appl. No.: 343,923

Related U.S. Application Data

[62] Division of Ser. No. 32,736, April 28, 1970, Pat. No. 3,765,934.

[52] U.S. Cl. .............................. 428/407; 156/272; 156/334; 260/17.4 CL; 264/109; 264/DIG. 7; 428/511; 428/537

[51] Int. Cl.² .................. B32B 21/02; B32B 27/04; B32B 27/28; B29J 5/04

[58] Field of Search ............... 117/62, 93.31, 145, 117/148, 155 UA, 161 UA, 161 UC, 161 UZ, DIG. 3; 156/272, 334, 62.2; 161/168, 250, 270; 264/109, DIG. 7; 260/17.4 R, 17.4 CL; 428/407, 511, 537

[56] References Cited
UNITED STATES PATENTS

| | | |
|---|---|---|
| 2,866,771 | 12/1958 | Sellers .......................... 117/148 X |
| 3,083,118 | 3/1963 | Bridgeford ......................... 117/47 |
| 3,085,986 | 4/1963 | Muskat ........................ 260/96 R X |
| 3,108,902 | 10/1963 | Galli et al. ........................ 117/126 |
| 3,493,527 | 2/1970 | Schueler ........................... 260/17.2 |
| 3,663,261 | 5/1972 | Miettinen et al. .................... 117/59 |
| 3,779,797 | 12/1973 | Mäkinen ............................. 117/116 |

*Primary Examiner*—Douglas J. Drummond
*Assistant Examiner*—Robert A. Dawson
*Attorney, Agent, or Firm*—Roylance, Abrams, Berdo & Kaul

[57] ABSTRACT

There is disclosed the preparation of polymer composites with porous cellulosic materials, such as wood. The process for forming such a composite involves impregnating the wood with a polymerizable complex of a monomer combination such as a complex of maleic anhydride and styrene. The polymerization is uncatalyzed — i.e., it is conducted without employing conventional means for inducing polymerization of monomers in wood, such as high-energy radiation or the thermal decomposition of a chemical free radical precursor. There is also disclosed a solid, stable complex of styrene and maleic anhydride.

13 Claims, No Drawings

CELLULOSE-POLYMER COMPOSITES

This is a division of application Ser. No. 32,736 filed Apr. 28, 1970 and now U.S. Pat. No. 3,765,934. This invention relates to the preparation of polymer composites with porous cellulosic materials. More particularly, this invention relates to the impregnation of wood with a particular type of self propagating polymerizable material and the subsequent polymerization of this material in situ. A further aspect of this invention relates to a single phase, solid admixture of styrene and maleic anhydride.

The impregnation of wood with vinyl monomers such as styrene, methyl methacrylate, acrylonitrile and vinyl acetate, and the subsequent polymerization of those monomers in situ to improve the dimensional stability and other properties of the wood is well known. Polymerization is induced either by the action of high energy radiation on the monomer or by the thermal decomposition of a chemical free radical precursor, such as benzoyl peroxide. The radiation induced polymerization of a combination of styrene and maleic anhydride in wood is described in German Pat. No. 1,273,787.

There are disadvantages in the use of chemical free radical catalysts to induce in situ polymerization of vinyl monomers in wood. Wood contains phenolic compounds (lignin) which act as polymerization inhibitors. These inhibitors may consume the chemical catalysts and the polymerization may not proceed to the desired extent. Moreover, wood is a very poor thermal conductor and such catalysts require elevated temperatures for extended times in order to be effective. Such temperatures may be deleterious to the wood and may result in monomer loss due to volatilization.

The use of radiation to induce polymerization overcomes some of the disadvantages inherent in the use of a chemical free radical catalyst since no heating is required. However, other factors, such as the cost of complex irradiating equipment and problems encountered in processing the material, render it undesirable. Moreover, irradiation may itself be detrimental to the wood.

The incorporation of a preformed polymer into wood does not solve the problems encountered in the in situ polymerization of a vinyl monomer in wood since this would require the use of a solvent. The use of a solvent is not desirable since the evaporation of the solvent to deposit the polymer would create voids in the wood. Moreover, the relatively high molecular weight and/or viscosity of a polymer would impede its diffusion and penetration into the capillaries and through the cell membranes of the wood.

It is an object of this invention to provide a coupled composite of a polymer and a porous cellulosic material, such as wood, by the in situ polymerization of a material which polymerizes in a rapid, exothermic and self-propagating manner and which does not require the use of radiation or a chemical free radical catalyst at elevated temperatures to induce polymerization.

It is a further object of this invention to enhance the physical properties of wood such as its hardness, compressive strength, tensile strength, dimensional stability and resistance to penetration by liquids such as water.

It is still another object of this invention to utilize layers of wood which have been partially impregnated with a highly exothermic, polymerizable material as plies in a laminate—i.e., to use the polymerizable material as an adhesive in the preparation of plywood.

These and other objects are attained by the practice of this invention which, briefly comprises impregnating a porous, cellulosic material, such as wood, with a polymerizable, equimolar complex of ethylenically unsaturated monomers, one of the monomers forming the complex being a strong electron acceptor and another being a strong electron donor. The product of the reactivity ratios of the monomers forming the complex is less than 0.2 and preferably is within the range 0 to 0.1. Preferably, at least one of the monomers forming the complex contains a functional group, such as a carboxyl group or an anhydride group which is reactive with hydroxyl groups on the cellulose substrate. The complex is then subjected to non-catalytic polymerization. The term "non-catalytic polymerization" means that high energy radiation or the thermal decomposition of a chemical free radical precursor to induce polymerization are not employed. The polymerization occurs through a charge transfer mechanism. It is a rapid, highly exothermic, self-propagating, non-inhibited reaction, thus permitting the polymerization to be propagated through the cellulosic material, such as wood, without inhibition by the lignin or other phenolic substances which would normally prevent or terminate a free radical type of polymerization reaction. Moreover, when the polymerizable complex contains groups which are reactive with hydroxyl groups on the cellulose substrate, such as anhydride groups, these groups in the resultant polymer react with the cellulosic hydroxyl groups to form stable, covalent ester bonds as well as hydrogen bonds.

A strong electron acceptor is one whose e value is at least 1.0; and a strong electron donor is one whose e value is less than −0.5. The e values for a large number of monomers are listed in the literature, see J. Brandrup and E. H. Immergut, *Polymer Handbook*, Interscience Publishers, New York, 1964, pages II – 341 to II – 362, the disclosure of which is incorporated herein by reference.

Examples of compounds which are electron donors include styrene, ethylene, vinyl esters (e.g., vinyl acetate) and vinyl ethers (e.g., vinyl isobutyl ether). Electron acceptors include maleic anhydride, diesters of maleic acid (e.g., di-n-butyl maleate), acrylonitrile and methyl methacrylate. Not all of these monomers are strong electron acceptors or donors and, therefore, may not be used as the sole electron acceptor or donor in the polymerizable complex. As will be more fully discussed hereinafter, another electron donor or acceptor may be used in combination with the strong electron donor or acceptor to modify the properties of the complex.

It is known that the tendency toward alternation of monomer units in a polymer is described by the product of the reactivity ratios of the monomers. If the product is 1.0, the monomer units will be incorporated into the copolymer in a purely random manner, influenced by the concentration of each monomer in the system. If the product of the reactivity ratios is less than 1.0, the units of each monomer will tend more to alternating in the polymer, the smaller the product the greater the tendency to alternation. The reactivity ratios of a large number of monomer pairs have been determined and are set forth in the literature, see *Polymer Handbook*, pages II–142 to II–335, the disclosure of which is incorporated herein by reference.

The term "impregnating" as used herein is intended to include partial as well as complete impregnation. Thus, the term includes instances wherein all or substantially all of the voids in the porous cellulosic material are filled with the polymerizable complex; as well as a surface coating of the cellulosic material with the polymerizable complex in which the polymerizable material fills only a portion of the voids in the cellulosic material.

The preferred polymerizable complex is one which is formed from equimolar amounts of styrene and maleic anhydride. The polymer which is formed in situ in the cellulosic material using such a complex is composed of alternating styrene and maleic anhydride moieties. A cross-linked structure may be obtained by replacing a portion of the styrene with divinylbenzene. Other complexes which may be used include maleic anhydride-conjugated diene (e.g., 1,1-disubstituted butadienes such as 4-methyl-1,3-pentadiene), styrene-vinylidene cyanide, and styrene-methyl α-cyanoacrylate.

The polymerization reaction of the styrene-maleic anhydride complex is so highly exothermic that temperatures occasionally are generated in the wood sufficiently high to scorch the internal wood surfaces. The peak temperature obtained during the polymerization may be decreased by modifying the basic equimolar styrene-maleic anhydride complex with other complex forming materials which may not themselves be capable of spontaneous polymerization. Thus, up to about 10 mole percent of the maleic anhydride may be replaced with another electron acceptor such as di-n-butyl maleate and up to about 20 mole percent of the styrene may be replaced with another electron donor such as a vinyl ether (e.g., vinyl isobutyl ether) or a vinyl ester (e.g., vinyl acetate or vinyl butyrate). Such modified compositions reduce the maximum temperature encountered during the polymerization from above 250°C. to below 200°C., and in some cases to below 150°C. The peak temperature may also be decreased by increasing the amount of styrene used to form the complex, e.g, by using 9 moles of styrene per mole of maleic anhydride. The complex which is formed is still equimolar and the other 8 moles of styrene merely act as a diluent insofar as the complex polymerization is concerned. However, the excess styrene undergoes polymerization under the influence of the heat caused by the exothermic reaction. Another means for decreasing the peak temperature is by using a multistage cure, e.g., 25°C. followed by 120°C. or 60°C. followed by 125°C. It is preferred to use the polymerizable complex by itself although a solvent may be employed. Any solvent which is used must be nonreactive with the maleic anhydride—i.e., it should not contain hydroxyl, amino, or sulfhydryl groups.

Charring may also be controlled by the impregnation of very thin pieces of wood.

It has been unexpectedly found that while maleic anhydride does not dissolve in styrene until the mixture is heated to 60°C., after the solution has been formed the mixture may be cooled and it will remain one phase—i.e., the maleic anhydride will not separate from the styrene. Moreover, upon cooling to below about 35°C, the homogeneous composition solidifies. Upon being heated to above 35°C. the composition again becomes liquid. Reliquidification may be accomplished even after several days of storage. This unique property of the styrene-maleic anhydride complex facilitates handling the composition since it provides a method for extending the pot life of the polymerizable complex. It is preferred to incorporate an inhibitor into the composition, such as t-butyl catechol or other phenolic material in order to maintain a longer room temperature pot life of the polymerizable complex and to permit sufficient time to impregnate the wood before premature polymerization of the liquid polymerizable complex. The function of the inhibitor is to inactivate potential polymerization initiators such as peroxides or oxygen. While the polymerization of the complex cannot be inhibited once polymerization is started, the presence of an inhibitor helps to prevent polymerization from being initiated.

Various types of wood may be treated in accordance with the practice of this invention. For instance, white pinewood, redwood and Douglas fir plywood may be impegnated and cured with the polymerizable complex. Preferably the wood should contain no more than about 5 molar percent of moisture.

Impregnation of the wood with the polymerizable complex may be facilitated by first subjecting the wood to a vacuum while it is immersed in the polymerizable complex in order to remove air from the voids in the wood. The subsequent application of pressure forces the complex into the voids. The polymerization may be initiated by the application of heat, e.g., by exposing the impregnated material to a temperature of from 70°C. to 125°C. by the use of a heat lamp, press or oven. Once initiated, it is highly exothermic and self-propagating and does not require the continued application of heat. The polymerization may be carried out in the absence of a catalyst. However, a free radical generator, such as a peroxidic compound, may be used at low concentrations to reduce the induction period which may result from the incorporation of an inhibitor in the composition. In most cases, less than 0.5% of free radical generator by weight of the monomers is sufficient to overcome the effect of the inhibitor.

It is frequently desirable in accordance with the practice of this invention to restrict the impregnation of the polymerizable complex to the surface of the wood, permitting only a moderate penetration of the complex. The complex is then polymerized in situ resulting in a polymer-wood composite having increased density and hardness and decreased water absorptivity.

Impregnation restricted to the surface of the wood may be accomplished by multistep coating (i.e., coating the surface with the polymerizable complex followed by curing to establish a subsurface polymer layer, and then coating and curing again); or by modifying the polymerizable complex to increase its viscosity and thereby decrease its absorption rate and penetration into the wood.

An increase in viscosity may be accomplished by adding to the polymerizable complex a low molecular weight polymer, e.g., one having a molecular weight of from about 500 to 10,000, which is soluble in the complex. Preferably, the polymer is composed of the same monomeric units as is the complex—i.e., if the complex is styrene-maleic anhydride, the polymer is preferably a copolymer of styrene and maleic anhydride. From about 1 to 50% by weight of polymer may be added to the complex to achieve an increase in viscosity, depending upon the molecular weight of the polymer.

An inorganic filler, such as silica or calcium silicate, may also be added to the polymerizable complex to increase the viscosity.

Another means for increasing the viscosity of the complex composition is to mix it with wood pulp to form a paste. This paste may then be used as an adhesive layer between sheets of wood.

Sheets of wood which have been impregnated on their surfaces with the polymerizable monomer may be used to prepare laminates. For instance, veneer wood or cedar wood shingles so impregnated may be used to prepare laminates containing 2 to 5 or more plies by superimposing the sheets on one another and curing them in a press at about 100° to 125°C. under moderate pressure. The polymerizable complex thus acts as a reactive adhesive in the preparation of plywood. The practice of this invention may also be used with wood chips, saw dust and other forms of particulate cellulosic materials such as in the preparation of reconstituted wood products, e.g., composition board. The polymerizable complex then serves as both an impregnant and a binder for the particulate material. The polymerizable complex may be admixed with wood fibers or wood pulp to prepare a paste which may be used as an adhesive layer for bonding pieces of wood.

By the practice of this invention, a wood-polymer composite may be prepared in which the original weight of the wood is increased by from 10 to 150% due to the incorporation therein of the polymer. Such a composite may be regarded as a plastic reinforced with the naturally oriented strands of the wood, the capillaries and interstices of the wood being filled with polymer. Thus, the wood is the continuous phase and the polymer is present as an ordered dispersion in intimate contact with the structure of the wood. Moreover, when the complex from which the polymer is formed contains a carboxyl group or an anhydride group which is reactive with hydroxyl groups on the cellulose substrate, chemical bonds are formed between the polymer and the wood, thus increasing the homogeneity of the system.

The polymer-wood composites of this invention are dimensionally stable, water repellant, resistant to solvents and have improved mechanical properites, as compared to untreated wood, such as hardness, toughness, impact strength, tensile strength, flexural strength and compression strength.

The following examples illustrate the best modes contemplated for carrying out this invention. Unless otherwise stated, the styrene used in these examples contains about 15 ppm of t-butyl pyrocatechol inhibitor.

EXAMPLE 1

A mixture of maleic anhydride (9.8 g.; 0.1 mole) and styrene (10.4 g.; 0.1 mole) are heated to 83°C. to form a homogeneous solution. Upon cooling, crystallization of the solution starts at about 35°C. and the solution is transformed into a solid mass at room temperature. When reheated in a water bath, the solid crystals melt at 35°C. The polymerizable complex solution is easy to handle at tempratures between 40°C. and 50°C.

EXAMPLE 2

The process of Example 1 is repeated using uninhibited styrene and adding 0.04 g. of t-butyl catechol. On cooling to 25°C., a stable solid mass is obtained which remains stable for several days. The mass has a melting point of 35°C. Upon the addition of 0.4 g. of benzoyl peroxide, the solution remains stable at 50°C for 6 hours.

EXAMPLE 3

Maleic anhydride (98 g.; 1 mole), styrene containing no inhibitor (104 g.; 1 mole) and t-butyl catechol (0.4 g.) are heated together at 70°C. until a clear solution is obtained. The resultant polymerizable complex is cooled to 35°C. and benzoyl peroxide (0.4 g.) is added.

Pieces of pinewood which have been dried at 105°C. to constant weight are immersed in the polymerizable complex and the immersed wood is subjected to a vacuum which is gradually increased to about 8 to 10 mm. of Hg for about 15 minutes. While the wood is still immersed in the polymerizable complex, it is transferred to an autoclave heated to a temperature of 50°C. The autoclave is then flushed with nitrogen and pressureized with nitrogen to about 1,000 to 1,200 psi. This pressure is maintained for about 15 minutes and then slowly released The impregnated wood pieces are removed from the polymerizable complex, dried with a paper towel and weighed. The wood is then cured by placing the pieces in contact with plates heated to a temperature of 100°C. Polymerization starts from the heated surface and propagates to the interior of the wood. The apparent density of the wood increases from an initial value of 0.5 g./cc to 1.0 g./cc. The Shore D hardness of the treated wood is 63–84. The wood increases in weight by 100%.

In the following examples, the weight increase, the density of the wood both before and after impregnation and curing and the hardness of the final product are set forth in Table 1.

EXAMPLE 4

Pinewood is impregnated as described in Example 3 with the composition of that Example. The impregnated wood is wrapped in aluminum foil and placed in an oven at 70°C. to cure the polymerizable complex.

EXAMPLE 5

Example 4 is repeated except that 0.1 mole of the maleic anhydride is replaced with 0.1 mole (23.3 g.) of di-n-butyl maleate and the benzoyl peroxide is omitted. The impregnated wood is cured in an oven at 80°C. The polymerization reaction starts after an induction period of about 40 minutes. The temperature in the wood reaches a maximum of 190°C.

EXAMPLE 6

A polymerizable complex is prepared comprising uninhibited styrene (104.0 g.; 1 mole), maleic anhydride (88.0 g.; 0.9 mole), di-n-butyl maleate (23.2 g.; 0.1 mole) and t-butyl catechol (0.1 g.). Fir plywood, ¾ inch in thickness containing 5 layers is placed in the complex so that only about the bottom layer is immersed. Impregnation is carried out applying vacuum but no pressure. The plywood is then heated in an oven at 120°C. The whole piece is impregnated through with an effectiveness of about 75%.

EXAMPLE 7

A polymerizable complex is prepared by heating to about 70°C. uninhibited styrene (93.6 g.; 0.9 mole), vinyl isobutyl ether (10.0 g.; 0.1 mole), maleic anhydride (98.0 g.; 1 mole) and hydroquinone (0.1 g.). The complex is cooled to about 40°C. and t-butyl perbenzoate (0.05 g.) is added. Pinewood is impregnated with the complex as described in Example 3 and the wood is cured in an oven at 80°C.

EXAMPLE 8

A composition is prepared by adding uninhibited styrene (93.6 g.; 0.9 mole), vinyl acetate (8.6 g.; 0.1 mole) and hydroquinone (0.1 g.) to molten maleic anhydride (98.0 g.; 1 mole). Pinewood is impregnated with the complex as described in Example 3 and polymerization is initiated by heating the wood in an oven for 70 minutes at 60°C. A maximum temperature of 202°C. is reached after 2.5 hours. The copolymer with which the wood is impregnated is soluble in acetone and methyl ethyl ketone. Therefore, the treated wood may be surface polished by rubbing with these solvents.

EXAMPLE 9

A polymerizable complex is prepared by heating uninhibited styrene (83.2 g.; 0.8 mole), vinyl acetate (17.2 g.; 0.2 mole), and maleic anhydride (98.0 g.; 1 mole). Pinewood is impregnated with the complex as described in Example 3 and polymerization is initiated by heating the impregnated wood in an oven at 70°C. for about 15 minutes. The treated wood is much more resistant to water absorption than is untreated wood.

EXAMPLE 10

The polymerizable complex described in Example 9 is used to impregnate pinewood. The wood is kept at 25°C. for 48 hours and then is heated in an oven at 50°C. for 5 hours and finally at 100°C. for 2 hours. The peak temperature reached in the wood is 120°C. This example illustrates that by a multi-stage curing process, the wood may be cured at a maximum peak internal temperature of 120°C.

TABLE 1

| EXAMPLE | APPARENT DENSITY (g./cc.) | | WEIGHT INCREASE | SHORE D HARDNESS |
|---|---|---|---|---|
| | Before | After | | |
| 4 | 0.51 | 1.05 | 98% | 73–84 |
| 5 | 0.54 | 1.14 | 109% | 80–87 |
| 6 | 0.48 | 0.85 | 71% | 74–80 |
| 7 | 0.54 | 1.04 | 93% | 70–76 |
| 8 | 0.54 | 1.14 | 111% | 80–90 |
| 9 | 0.54 | 1.13 | 110% | 85–88 |
| 10 | 0.60 | 1.17 | 133% | 82–84 |

EXAMPLE 11

This example illustrates the use of an excess of styrene to reduce the peak temperature reached during polymerization. Styrene (93.6 g.; 0.9 mole), maleic anhydride (9.8 g.; 0.1 mole) and benzoyl peroxide are mixed and used to impregnate pinewood as described in Example 3. The impregnant composition thus contains 20 mole % of styrene-maleic anhydride complex and 80 mole % of excess styrene. The wood is cured in an oven in 2 stages. During the first stage, the oven is heated at 60°C. and the peak temperature inside the wood is 90°C. During the second stage, the oven is heated at 128°C. and the maximum temperature reached in the wood is 155°C.

EXAMPLE 12

This example shows the preparation of a composition board from sawdust. Predried pine sawdust is mixed with 50% of its weight of the polymerizable complex described in Example 9. The mixture is pressed in a ⅛ inch deep mold at 120°C. for 30 minutes under a ram pressure of 10,000 psi. Much of the polymerizable complex is squeezed out. The board is then post-cured in an oven at 120°C. for 1 hour. The molding has a smooth surface, an apparent density of 105 g./cc. and a Shore D hardness of 84–90.

The following examples illustrate restricting the impregnation of the polymerizable complex to the surface of the wood.

EXAMPLE 13

Styrene (10.4 g.), maleic anhydride (9.8 g.), a styrene-maleic anhydride copolymer having a molecular weight of 800 and an acid number of 475 (5.0 g.) and benzoyl peroxide (0.1 g.) are heated together at 80°C. Two pieces of veneer, each piece being 0.5 mm in thickness, are painted on one side with the resultant composition and cured in an oven at 70 to 80°C. The surfaces are coated a second time with the same composition and the two pieces are joined with the coated sides together, wrapped in aluminum foil and pressed at 100°C. for 10 minutes at 950 psi pressure. A good laminate is obtained which absorbs only about one-third as much water as an untreated control. The treated sample does not delaminate in the water.

EXAMPLE 14

The process of Example 13 is repeated substituting 2.0 g. of copolymer for the 5.0 g. used in that example. A pinewood laminate is prepared as described in Example 13 by pressing at 100°C. for 10 minutes at a pressure of 1,000 psi. The laminate has a good water resistant bond.

EXAMPLE 15

A composition is prepared as described in Example 14 except omitting the benzoyl peroxide. A four-ply laminate of veneer-pine-pine-veneer is prepared by coating each ply with the composition and pressing at 125°C for 15 minutes at 1,000 psi. The veneer outer layers are glossy indicating complete impregnation while the inner pine layers are not completely impregnated. Bonding is good.

EXAMPLE 16

Styrene (10.4 g.), maleic anhydride (9.8 g.) and the copolymer of styrene and maleic anhydride identified in Example 13 (1.0 g.) are heated at 60°to 70°C. for 20 minutes until the mixture becomes slightly gelatinous. Monomethyl ether of hydroquinone (0.02 g.) is immediately added and the mixture is cooled. On standing over night, the solution becomes a gelatinous, crystalline aggregate. On heating to 60°C., the mixture reliquifies to form a slightly ropy liquid. The composition is brushed on one side of an 8 × 8 cm cedar wood shingle, which is 6 mm in thickness, the impregnated shingle is wrapped in aluminum foil and heated in a press at 120°C. for 10 minutes at 410 psi pressure. Cedar wood shingles coated with this composition are also cured under a heat lamp at 70° to 80°C. for 10 minutes. Further samples are cured in an oven at 80°C. for 20 minutes.

A laminate is prepared from the above composition by heating the composition after 24 hours standing to 45°C. to liquify it. The composition is brushed on one side of each of 5 pieces of pine veneer. The pieces are then joined with the coated sides together, wrapped in aluminum foil and pressed at 120°C. for twenty minutes at 800 psi pressure. The thickness of the pieces in the laminate are, respectively, 0.5 mm veneer, 3 mm pine, 11 mm pine, 3 mm pine and 5 mm veneer. A glossy laminate is obtained.

EXAMPLE 17

Styrene (31.2 g.), maleic anhydride (29.4 g.) and the styrene-maleic anhydride copolymer described in Example 13 (3.0 g.) are heated at 60° to 65°C. for 25 minutes and then monomethyl ether of hydroquinone (0.05 g.) is added. The liquid is then heated to 100°C. and, when cooled in cold water, exhibits a satisfactory viscosity. A 5-ply veneer pinewood laminate is prepared with this composition as described in Example 16 and the laminate is pressed at 125°C. for 15 minutes at 210 psi.

Two pieces of cedar wood shingle (7.9 × 7.9 × 0.85 cm) are dried in an oven at 80°C for 1 day and then in a desiccator over $CaCl_2$ for 3 days. One piece is used as a blank in a rain simulator test. The other piece is painted on one side and on the edges with the above composition which is five days old. The coverage is 0.0243 g. $cm^2$ (excluding the edges in the calculation.) The coated shingle is cured under a heat lamp at 70° to 80°C. for 25 minutes. Both the treated and untreated shingles are subjected to a rain simulation test. In this test the shingles are exposed to air and conditioned under ambient conditions for 24 hours. The samples are then exposed to dripping distilled water at a rate of 50 drops per minute. The samples are weighed after 1 and 2 hours exposure and again after 1 hour of air drying. The percent of weight increase is then determined. The respective values for the treated wood are 4.6%, 5.7% and 2.6% while the respective values for the untreated wood are 15.0%, 17.0% and 5.5%. Thus, this test shows that wood treated in accordance with this invention absorbs only about one-third as much water as does untreated wood.

EXAMPLE 18

Styrene (10.4 g.), maleic anhydride (9.8 g.) benzoyl peroxide (0.1 g.) and calcium silicate (4.0 g) are mixed to give a smooth paste. A laminate is prepared by coating one side each of two pieces of oven dried veneer. The painted pieces are joined with the coated sides together, the composite is wrapped in aluminum foil and pressed at 100°C. for 10 minutes at 1100 psi. A good laminate is obtained.

EXAMPLE 19

Maleic anhydride (9.8 g.; 0.1 mole) is dissolved in styrene (8.3 g.; 0.08 mole) containing no inhibitor at 60°C. Vinyl acetate (1.7 g.; 0.02 mole) is then added. The mixture gelatinizes partially at room temperature in 10 minutes. The partially gelatinized mixture is used to paint a cedar wood shingle which is then cured in an oven at 90°–100°C. for 30 minutes.

EXAMPLE 20

Polymer wood fiber composites are prepared by blending equal weights of wood fiber and monomer(s) along with 0.1% by weight of benzoyl peroxide based on the weight of the monomer(s). The composition is placed in a mold and subjected to pressing in a press at 120°C. for 30 minutes at 1100 psi. Several samples are prepared in this manner using different monomers. The monomers used are: styrene, a complex of equimolar amounts of styrene and maleic anhydride, and a complex of styrene, divinylbenzene and maleic anhydride. Three of the samples contain divinylbenzene in which 5, 10 and 20 mole % respectively, of the styrene is replaced with the divinylbenzene. The resultant polymer-wood fiber composites contain polystyrene, styrene-maleic anhydride copolymer and styrene-divinylbenzene-maleic anhydride copolymer. The hardness of the composites increases in that order. The polystyrene-wood composite has little strength and readily crumbles. The styrene-maleic anhydride copolymer composite contains 13.3% copolymer which cannot be extracted with methyl ethyl ketone. This is an indication of the interaction which occurs between the copolymer and the wood. The cross-linked styrene-divinylbenzene-maleic anhydride copolymer-wood fiber composite contains 75.4% non-extractible copolymer. The composite containing the cross-linked styrene-divinylbenzene-maleic anhydride copolymer has better mechanical properties, i.e. flexural modulus and strength, tensile modulus, and tensile work energy than does the composite containing the styrene-maleic anhydride copolymer.

EXAMPLE 21

A dry mixture comprising 7.4% by weight of wood fiber and 92.6% by weight of an equimolar mixture of styrene and maleic anhydride containing 0.1% by weight of benzoyl peroxide is placed between two overlapped wood pieces. The lapped area is pressed at 120°C. under 1000 psi pressure for thirty minutes. A good adhesive bond is obtained.

Other coupled wood polymer composites may be prepared employing the procedures set forth in the preceding examples and in the more general description of this invention set forth hereinabove.

What is claimed is

1. A process for the preparation of a molded object which comprises impregnating particles of a porous, cellulosic material with a polymerizable equimolar complex of styrene and maleic anhydride, molding said impregnated particles into an object and thereafter subjecting said complex in situ to non-catalytic polymerization, the anhydride groups in the resultant polymer reacting with cellulosic hydroxyl groups whereby bonds are formed between the polymer and said cellulosic material.

2. The process of claim 1 wherein said porous, cellulosic material is wood.

3. The process of claim 2 wherein up to 20 mole percent of the styrene is replaced with divinylbenzene.

4. The process of claim 2 wherein up to 10 mole percent of said maleic anhydride is replaced with di-n-butyl maleate.

5. The process of claim 2 wherein up to 20 mole percent of said styrene is replaced with vinyl isobutyl ether or vinyl acetate.

6. The process of claim 2 wherein said complex is used in conjunction with an excess amount of styrene.

7. The process of claim 2 wherein said complex contains a polymerization inhibitor.

8. The process of claim 2 wherein said polymerization is conducted by exposing said impregnated wood particles to a temperature of from about 70° to 125°C.

9. The process of claim 2 wherein said polymerization is conducted at more than one temperature, the first temperature being substantially lower than the final temperature.

10. The process of claim 2 wherein said complex contains dissolved therein a low molecular weight copolymer of styrene and maleic anhydride.

11. The process of claim 2 wherein said polymerizable complex of styrene and maleic anhydride has a melting point of about 35°C.

12. A molded object obtained by the process of claim 1.

13. A molded object obtained by the process of claim 2.

* * * * *